US006418431B1

(12) United States Patent
Mahajan et al.

(10) Patent No.: US 6,418,431 B1
(45) Date of Patent: Jul. 9, 2002

(54) INFORMATION RETRIEVAL AND SPEECH RECOGNITION BASED ON LANGUAGE MODELS

(75) Inventors: Milind V. Mahajan; Xuedong D. Huang, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/050,286

(22) Filed: Mar. 30, 1998

(51) Int. Cl.7 .............................................. G06F 17/30
(52) U.S. Cl. ................................ 707/4; 704/257; 704/9
(58) Field of Search ................................ 704/253, 243, 704/252, 258, 268, 9, 201, 257; 382/159, 116; 707/4

(56) References Cited

U.S. PATENT DOCUMENTS

| 4,831,550 | A | * | 5/1989 | Katz | 704/240 |
|---|---|---|---|---|---|
| 4,945,566 | A | * | 7/1990 | Mergel et al. | 704/253 |
| 4,947,438 | A | * | 8/1990 | Paeseler | 704/252 |
| 5,263,117 | A | * | 11/1993 | Nadas et al. | 704/200 |
| 5,384,892 | A | * | 1/1995 | Strong | 704/243 |
| 5,477,451 | A | * | 12/1995 | Brown et al. | 704/9 |
| 5,502,774 | A | * | 3/1996 | Bellegarda et al. | 382/159 |
| 5,615,296 | A | * | 3/1997 | Stanford et al. | 704/201 |
| 5,621,809 | A | * | 4/1997 | Bellegarda et al. | 382/116 |
| 5,680,511 | A | * | 10/1997 | Baker et al. | 704/257 |
| 5,689,617 | A | * | 11/1997 | Pallakoff et al. | 704/255 |
| 5,710,866 | A | * | 1/1998 | Alleva et al. | 704/256 |
| 5,765,133 | A | * | 6/1998 | Antoniol et al. | 704/255 |
| 5,819,220 | A | * | 9/1998 | Sarukkai et al. | 704/243 |
| 5,829,000 | A | * | 9/1998 | Huang et al. | 704/252 |
| 5,835,888 | A | * | 11/1998 | Kanevsky et al. | 704/9 |
| 5,899,973 | A | * | 5/1999 | Bandara et al. | 704/256 |
| 5,905,972 | A | * | 5/1999 | Huang et al. | 704/268 |
| 5,913,193 | A | * | 6/1999 | Huang et al. | 704/258 |
| 5,937,384 | A | * | 8/1999 | Huang et al. | 704/256 |
| 5,963,903 | A | * | 9/1999 | Hon et al. | 704/254 |
| 6,073,091 | A | * | 6/2000 | Kanevsky et al. | 704/9 |
| 6,081,779 | A | * | 6/2000 | Besling et al. | 704/257 |
| 6,141,641 | A | * | 10/2000 | Hwang et al. | 704/247 |
| 6,154,722 | A | * | 11/2000 | Bellegarda | 704/257 |
| 6,157,912 | A | * | 12/2000 | Kneser et al. | 704/270 |
| 6,167,398 | A | * | 12/2000 | Wyard et al. | 707/5 |
| 6,182,039 | B1 | * | 1/2001 | Rigazio et al. | 704/257 |

FOREIGN PATENT DOCUMENTS

| EP | 0 645 757 A1 | 3/1995 |
|---|---|---|
| EP | 0 687 987 A1 | 12/1995 |
| WO | WO 96/41333 | 12/1996 |
| WO | WO 98/34180 | 8/1998 |

OTHER PUBLICATIONS

Bellegarda, J., "A Statistical Language Modeling Approach Integrating Local and Global Constraints," IEEE, pp. 262–269.*

(List continued on next page.)

Primary Examiner—Thomas Black
Assistant Examiner—Charles L. Rones
(74) Attorney, Agent, or Firm—Joseph R. Kelly; Westman, Champlin & Kelly, P.A.

(57) ABSTRACT

A language model is used in a speech recognition system which has access to a first, smaller data store and a second, larger data store. The language model is adapted by formulating an information retrieval query based on information contained in the first data store and querying the second data store. Information retrieved from the second data store is used in adapting the language model. Also, language models are used in retrieving information from the second data store. Language models are built based on information in the first data store, and based on information in the second data store. The perplexity of a document in the second data store is determined, given the first language model, and given the second language model. Relevancy of the document is determined based upon the first and second perplexities. Documents are retrieved which have a relevancy measure that exceeds a threshold level.

36 Claims, 4 Drawing Sheets

OTHER PUBLICATIONS

Niesler et al., "Modelling Word–Pair Relations in a Category–Based Language Model," IEEE, pp. 795–798.*

Kneser et al., "Semantic Clustering for Adaptive Language Modelling," IEEE, pp. 779–782.*

Masataki et al., "Task Adaptation Using Map Estimation in N–Gram Language Modeling," IEEE, pp. 783–786.*

Goodman, J. T., "Putting It All Together: Language Model Combination," Acoustics, Speech, and Signal Processing, 2000. ICASSP '00 Intern'l Conf. on, v. 3, pp. 1647–1650.*

Kawabata, T., et al., "Back–Off Method For N–Gram Smoothing Based on Binomial Posterior Distribution," Acoustics, Speech, and Signal Processing, 1996. ICASSP–96. v. 1, pp. 192–195, 1996.*

"Spoken language systems–beyond prompt and response" by PJ Wyard et al. *BT Technology Journal* Jan. 1996, No. 1 pp. 187–205.

"Construction of Language Models for Spoken Database Queries" by D. Mergel, A. Paeseler. *IEEE* 1987 pp. 844–847.

"Implications of the Perplexity Definition" Eagles Handbook of Standards and Resources for Spoken Language Systems. Online! May 1997 (1997–05).

"Task Adaption in Stochastic Language Models for Continuous Speech Recognition" by Shoichi Matsunaga, Tomokazu Yamada and Kiyohiro Shikano. IEEE Mar. 23, 1992 pp. I–165 —I168.

"Predicting Unseen Triphones with Senones", by Mei–Yuh Hwang, Xuedong Huang, and Fileno A. Alleva, *IEEE Transactions On Speech and Audio Processing,* vol. 4, No. 6, Nov. 1996, pp. 412–419.

"Micosoft Windows Highly Intelligent Speech Recognizer: Whisper", by Xuedong Huang, Alex Acero, Fil Alleva, Mei–Yuh Hwang, Li Jiang and Milind Mahajan, 1995, *IEEE,* pp. 93–96, Huang et al., 1995 *IEEE,* pp. 93–96.

Lippmann, E.A. Martin, D.P. Paul, "Multi–Style Training for Robust Isolated–Word Recognition", *Proceedings of DARPA Speech Recognition Workshop,* Mar. 24–26, 1987, pp. 96–99.

X. Huang, A. Acero, F. Alleva, M. Hwang, L. Jiang, and M. Mahajan. "From Sphinx–II to Whisper–Making Speech Recognition Usable". *Speech and Speaker Recognition–Advanced Topics,* Kulwer Publisher, 1994, pp. 481–508.

* cited by examiner

INFORMATION RETRIEVAL AND SPEECH RECOGNITION BASED ON LANGUAGE MODELS

BACKGROUND OF THE INVENTION

The present invention deals with speech recognition and information retrieval. More specifically, the present invention deals with a speech recognition system which employs information retrieval techniques to adapt a language model, and an information retrieval technique which employs speech recognition language models for retrieving relevant documents.

Generally, information retrieval is a process by which a user finds and retrieves information, relevant to the user, from a large store of information. In performing information retrieval, it is important to retrieve all of the information a user needs (i.e., it is important to be complete), and at the same time it is important to limit the irrelevant information that is retrieved for the user (i.e., it is important to be selective). These dimensions are often referred to in terms of recall (completeness) and precision (selectivity). In many information retrieval systems, it is necessary to achieve good performance across both the recall and precision dimensions.

In some current retrieval systems, the amount of information that can be queried and searched is very large. For example, some information retrieval systems are set up to search information on the internet, digital video discs, and other computer data bases in general. These information retrieval systems are typically embodied as, for example, internet search engines, and library catalog search engines.

Many information retrieval techniques are known. A user input query in such techniques is typically presented as either an explicit user generated query, or as an implicit query, such as when a user requests documents or information which is similar to a certain set of existing documents. Typical information retrieval systems then search documents in the large data store at either a single word level, or at a term level. Each of the documents are assigned a relevancy (or similarity) score, and the information retrieval system presents a certain subset of the documents searched to the user, typically that subset which has a relevancy score which exceeds a given threshold.

Some currently known information retrieval techniques or methods include full text scanning, the use of signature files, inversion, vector modeling and clustering, and tf*idf (term frequency*inverse document frequency). In full text scanning, Boolean functions are used in a query to determine whether a document to be searched contains certain letter strings. It is common in such scanning techniques to search each character of a document to see whether it satisfies the search string (i.e., the query) and then move the search one position to the right when a mismatch is found. This system has been adapted to use other ways of preprocessing the query, such as moving more than one position to the right when a mismatch is found.

The use of signature files involves discarding common words from documents to be searched and reducing the non-common words to stems. Each document to be searched yields a bit string (i.e., a signature). The signatures for various documents are stored sequentially in a file separate from the documents themselves.

Inversion techniques involve constructing a list of key words to represent each document. The key words are stored in an index file. For each key word, a list of pointers is maintained which reveals qualifying documents. The query is then advanced against the index and the pointers are used to identify the relevant and qualifying documents.

Vector modeling and clustering involves grouping of similar documents into groups referred to as clusters (this technique can also be applied to terms instead of documents). In order to generate a cluster, an index is formed by removing common words and reducing the remainder of the words to stems (which includes prefix and suffix removal). Synonyms are also commonly placed in a concept class which can have its terms weighted by frequency, specificity, relevancy, etc. The index is used to represent the documents as a point in t-dimensional space. The points are then partitioned into groups with a similarity matrix which is typically developed through an iterative process. In order to search the cluster, a query is represented as a t-dimensional vector and is compared with the cluster centroids. A cluster-to-query similarity function is generated and is used to pull relevant documents. The documents which are pulled (or retrieved) are typically those with a similarity value that exceeds a predetermined threshold value.

Semantic information is used in some information retrieval techniques to capture more information about each document in the information store in order to achieve better performance. In one such system, natural language processing is used to match the semantic content of queries to that of the documents to be searched. Sentences or phrases are used as terms for indexing the documents to be searched. Latent semantic indexing involves forming a term/document matrix in which the number of occurrences of a term in a specific document are plotted on a matrix. Small singular values are typically eliminated and the remaining term frequency vectors are mapped. Queries are also formed of term frequency vectors and are mapped against the matrix which contains the term frequency vectors for the documents. The documents are ranked by using normalized linear products in order to obtain a cosine similarity measure.

Another type of information retrieval technique which uses semantic information is a neural network. Essentially, a thesaurus is constructed, and a node in a hidden layer is created to correspond to each concept in the thesaurus. Spreading activation methods are then used to conduct searches.

Term frequency*inverse document frequency (tf*idf) is another technique used to determine relevancy of documents. First, a term used in a query is measured against the document to determine the frequency of that term in the document. It is believed that the degree to which the document and the term are related increases as the frequency of the term in the document increases. It is also believed that the usefulness of a term in discriminating among documents decreases as the number of documents in which that term appears increases. Therefore, the frequency of the particular term is also measured against the whole data store to determine the frequency level of that term in all of the documents. These two measures are used in determining the relevancy of any given document in the data store being searched.

As the data bases which are accessible to searching become ever more numerous, and as those data bases become larger, the problems associated with information retrieval also become larger. In other words, acceptable performance across the recall and precision dimensions is often more difficult to obtain with larger and more numerous data bases under search.

Speech recognition systems use a combination of the acoustic and linguistic (or language) information contained in an utterance in order to generate a transcript of the meaning of the utterance. The language information used by a recognizer in a speech recognition system is collectively referred to as a language model.

Many current speech recognition systems use language models which are statistical in nature. Such language models are typically generated using known techniques based on a large amount of textual training data which is presented to a language model generator. An N-gram language model may use, for instance, known statistical techniques such as Katz's technique, or the binomial posterior distribution backoff technique. In using these techniques, the language models estimate the probability that a word w(n) will follow a sequence of words w1, w2, . . . w(n−1). These probability values collectively form the N-gram language model.

There are many known methods which can be used to estimate these probability values from a large text corpus which is presented to the language model generator, and the exact method by which this is done is not of importance to the present invention. Suffice it to say that the language model plays an important role in improving the accuracy and speed of the recognition process by allowing the recognizer to use information about the likelihood, permissibility, or meaningfulness, of sequences of words in the language. In addition, language models which capture more information about the language lead to faster and more accurate speech recognition systems.

Typically, the large training text corpus used to train the language model is specifically gathered and presented to the language model generator for that particular purpose. Thus, language models are typically generated for certain broad classes of use. Some classes of use may be the general English language, office correspondence, sports, etc.

However, the interests of any particular user, and therefore, the language used by that particular user, may typically be much more specific than these broad language model categories. Hence, the probability estimates generated by such a language model may not accurately model the actual language used by the user. Further, since the variety of interests among users is almost unlimited, it is very difficult to generate highly specialized language models for each user.

Some prior systems have attempted to handle this problem by adapting the language model with use. During adaptation, the probability estimates assigned to the word sequences by the language model are adjusted to more closely reflect the actual language of the user. The textual data used for the adaptation is user specific. This text data may, for example, consist of text which has been dictated by the user, or the text in documents generated, read or stored by the user. However, in order for a language model to be accurately adapted, it must be fed a large amount of data. The user specific data available is typically too sparse to rapidly adapt the language model or to generate a meaningful, user specific language model.

SUMMARY OF THE INVENTION

A language model is used in a speech recognition system which has access to a first, smaller data store and a second, larger data store. The language model is adapted by formulating an information retrieval query based on information contained in the first data store and querying the second data store. Information retrieved from the second data store is used in adapting or constructing the language model.

In one preferred embodiment, the first store, which is generally smaller, is believed to be more representative of the language that is currently being used by the user of the speech recognition system. The second store, which is generally larger, is very likely to be less representative of the language of the user in percentage terms.

Also, language models are used in retrieving information from the second data store. Language models are built based on information in the first data store, and based on information in the second data store. The perplexity of a document in the second data store is determined, given the first language model, and given the second language model. Relevancy of the document is determined based upon the first and second perplexities. Documents are retrieved which have a relevancy measure which exceeds a threshold level.

In one embodiment, the first data store represents the query or request by the user, and the second data store represents the library to be searched.

DETAILED DESCRIPTION OF THE PREFERRED EMBODIMENTS

Overview

Figure 1:
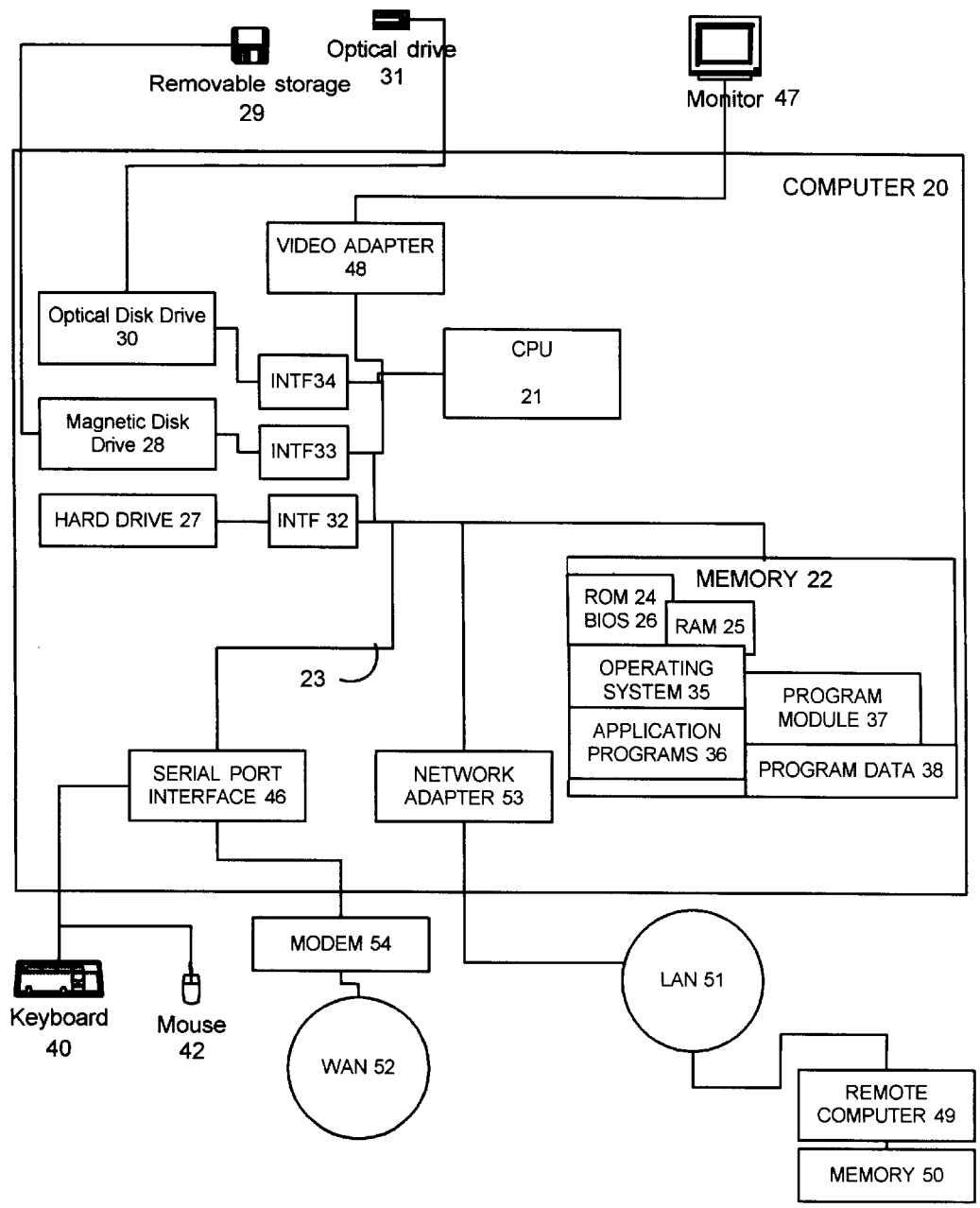
FIG. 1 is a block diagram of an exemplary environment for implementing a system in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including processing unit 21 (which may include one or more processors), a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown) a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor 47, personal computers may typically include other peripheral output devices (not shown), such as speakers and printers.

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2:
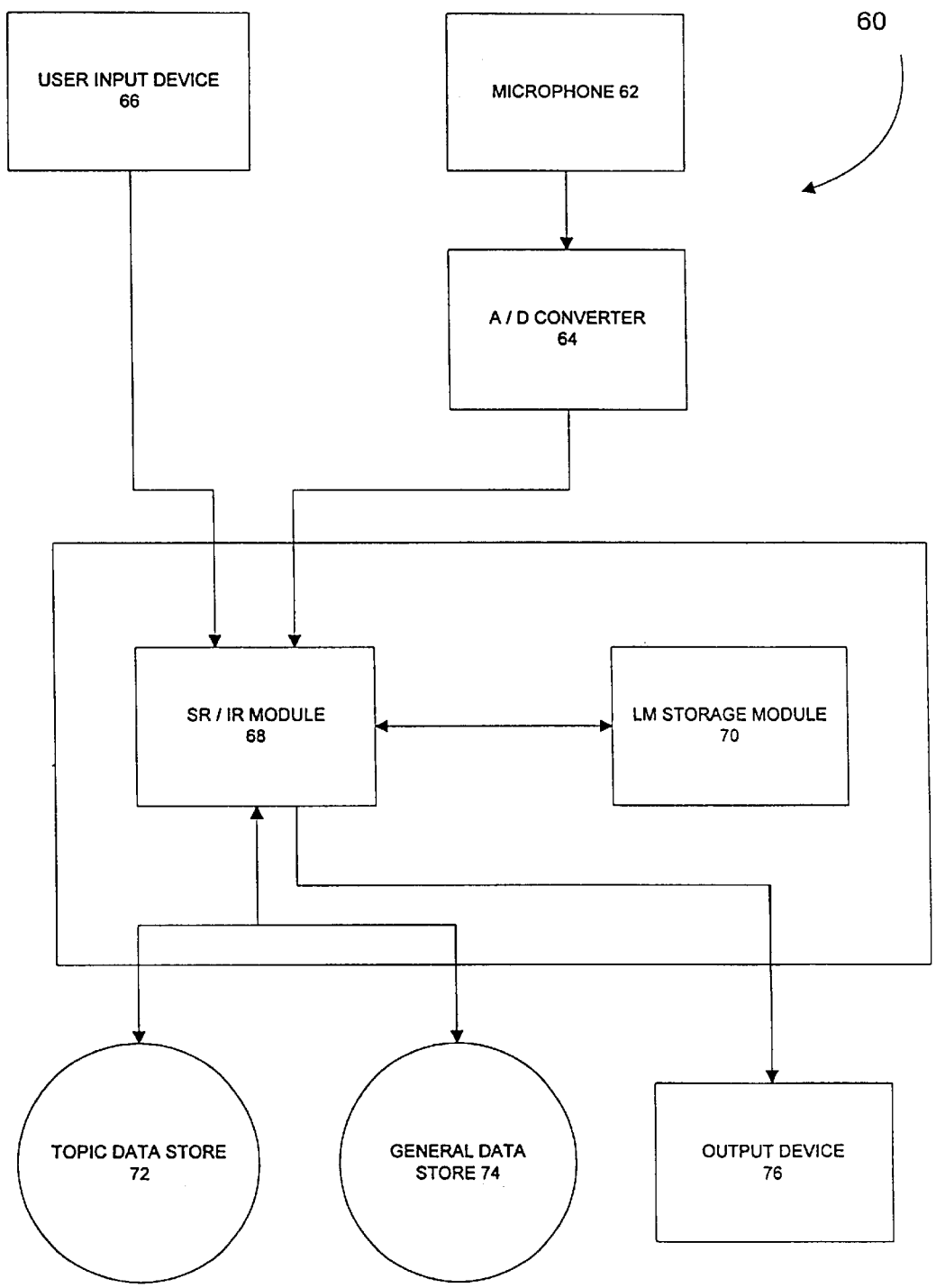
FIG. 2 is a more detailed block diagram of a system in accordance with the present invention.

FIG. 2 illustrates a block diagram of speech recognition/information retrieval (SR/IR) system 60 in accordance with one aspect of the present invention. SR/IR system 60 includes microphone 62, analog-to-digital (A/D) converter 64, user input device 66, SR/IR processor module 68, language model (LM) storage module 70, topic data store 72, general data store 74 and user output device 76.

It should be noted that the entire system 60, or part of system 60, can be implemented in the environment illustrated in FIG. 1. For example, microphone 62 may preferably be provided as an input device to personal computer 20, through an appropriate interface, and through A/D converter 64. User input device 66 may preferably be implemented as keyboard 40, mouse 42, or any other suitable input device. Language model storage module 70 is preferably stored in any suitable memory device shown in FIG. 1, or is provided to SR/IR module 68 by any of the data input mechanisms described with respect to FIG. 1. SR/IR module 68 is preferably either a hardware module in computer 20 (such as a dedicated speech recognition or information retrieval processor separate from CPU 21 or implemented in CPU 21), or a software module stored in any of the information storage devices disclosed in FIG. 1 and accessible by CPU 21 or any other suitable processor.

Topic data store 72 is also preferably stored in any suitable memory devices shown in FIG. 1, or is accessible by the system illustrated by FIG. 1. Also, topic data store 72 need not be local to computer 20 but may be merely accessible by computer 20. For example, topic data store 72 may be partially or totally stored in memory 50. A particular document being created, as well as other documents which have been created by the user, are stored in topic data store 72. Of course, it will be recognized that the data contained in topic data store 72 can be arranged according to any number of criteria, such as subject matter, types of documents (e.g., letters, memos, electronic mail transfers, facsimiles, etc.) or any other suitable criteria.

General data store 74 is preferably a larger data base, larger than topic data store 72, and is accessible by the system shown in FIG. 1. General data store may, for example, be any data base, or collection of data bases, accessible through wide area network 52, or through local area network 51.

In addition, output device 76 may, in one preferred embodiment, by implemented as monitor 47 or as a printer or as any other suitable output device.

In any case, for the sake of the present description, system 60 illustrates a system which is suitable for performing both speech recognition and information retrieval. However, it should be noted that system 60 may be configured to perform only speech recognition, or information retrieval, as appropriate for the various features and aspects of the present invention described below.

Adapting a Language Module

System 60 will now be described with respect to speech recognition. In recognizing speech, system 60 is trained utilizing acoustic information in a known manner. System 60 utilizes this information in later recognizing utterances entered into system 60 through microphone 62. Briefly, speech is input into system 60 in the form of an audible voice signal provided by the user to microphone 62. Microphone 62 converts the audible speech signal into an analog electronic signal which is provided to A/D converter 64. A/D converter 64 converts the analog speech signal into a sequence of digital signals which is provided to SR/IR module 68.

In one preferred embodiment, SR/IR module 68 includes a feature extraction module which is a conventional array processor that performs spectral analysis on the digital signals and computes a magnitude value for each frequency band of a frequency spectrum. The feature extraction module divides the digital signals into frames which include a plurality of digital samples which are converted to a string of output probability distributions that include probability values for a plurality of frequency bands. The output probability distributions are processed in a known manner to obtain likely speech units (such as phonemes, words or word sequences) which are representative of the speech received by microphone 62.

In one preferred embodiment, SR/IR module 68 identifies N likely word hypotheses which are indicative of the N most likely words or word sequences represented. SR/IR module 68 then accesses LM storage module 70. The language model stored in LM storage module 70 is used to estimate the probability of a word w(n) following a sequence of words w1, w, . . . w(n−1). These probabilities are then used to choose among the N-best hypotheses in order to obtain the most likely word or word sequence represented by the utterance. This most likely hypothesis is output at user output device 76.

The language model stored in LM storage module 70 may initially be constructed by SR/IR module 68, or be loaded into LM storage module 70 using a data input mechanism such as those discussed in FIG. 1 (e.g., using a floppy disk). In the embodiments in which SR/IR module 68 constructs the language module, a large training text corpus is provided to SR/IR module 68. Using that training text corpus, SR/IR module 68 constructs the language model in a known manner and stores it in LM storage module 70.

In addition, it should be noted that multiple language models can be stored in LM storage module 70. For example, a number of topic dependent language models can be stored in LM storage module 70 and retrieved by SR/IR module 68 based on an input by the user as to the subject of the particular document being created with the speech recognition system.

In any case, it is desirable that the particular language model or models stored in LM storage module 70 (however first obtained) be adapted based on the actual word usage of the user of system 60 in order to obtain a faster and more accurate model, which accurately models the actual language used by the user.

Figure 3:
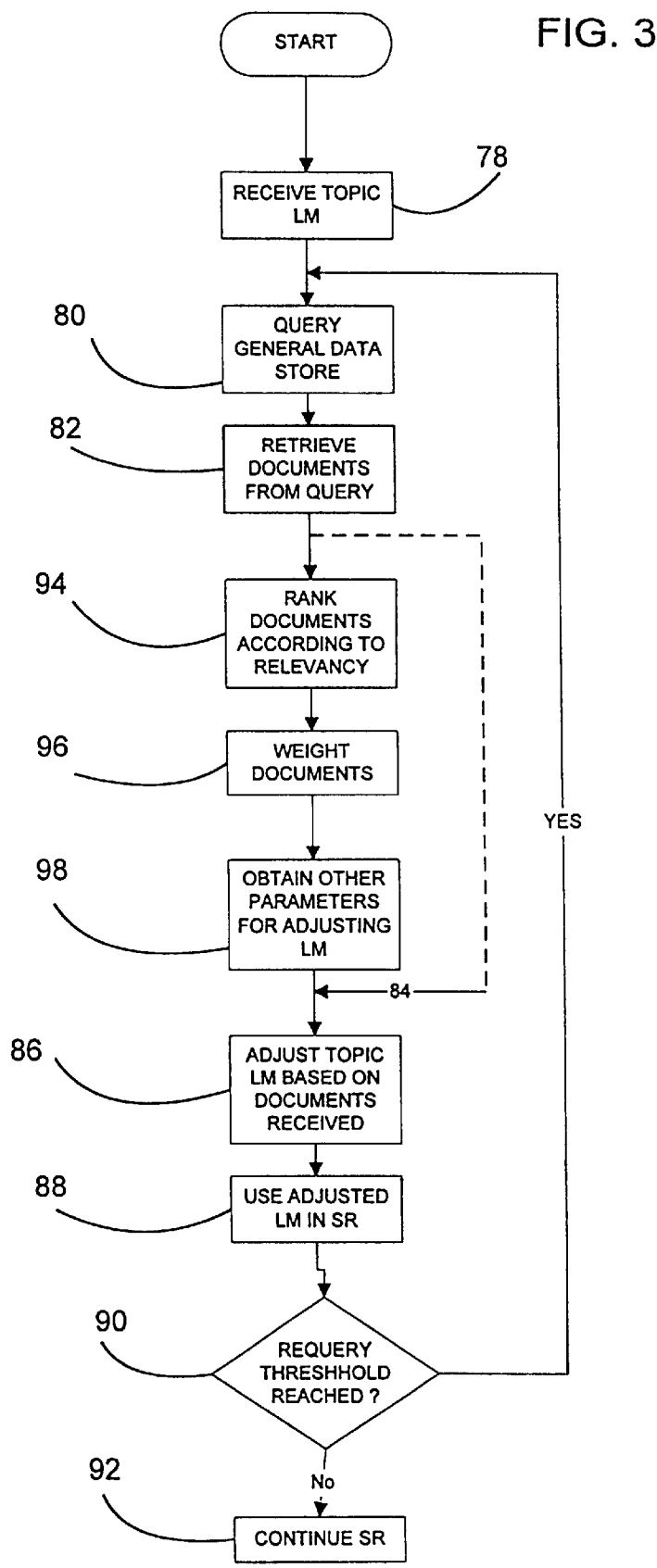
FIG. 3 is a flow diagram illustrating a document retrieval technique in accordance with one preferred embodiment of the present invention.

FIG. 3 illustrates one technique, in accordance with one aspect of the present invention, for accomplishing adaptation of the language model stored in LM storage module 70. A language model is first received by system 60. The language model can either be subject matter specific, user specific, application specific, or simply a general language model. As previously discussed, the language model can be either constructed by system 60 and stored in LM storage module 70, or simply loaded into LM storage module 70 through an appropriate input mechanism. The step of receiving the language model is indicated by block 78 in FIG. 3.

In order to adapt the language model, system 60 preferably uses the information stored in topic data store 72 as a portion of the text corpus used to adapt the language model stored in module 70. Topic data store 72 preferably contains a current document being prepared, other documents prepared by the present user, or other documents read by the present user, stored by the present user, or identified by the present user as being relevant to the current task.

Typically, this amount of user specific or current topic or task specific data is insufficient to rapidly adapt the language model stored in module 70, or to generate a more user/task-specific language model. Therefore, system 60 utilizes the user/task-specific information stored in topic data store 72 to generate a query against general data store 74. Recall that general data store 74 may include one or more data bases accessible over the internet (e.g., over WAN 52), a library data base, or another suitable large data base accessible by system 60 (such as through LAN 51). The query against general data store 74 is indicated by block 80 in FIG. 3.

The particular information retrieval technique used to generate and execute the query against general data store 74 is not critical to this feature of the present invention. Rather, any suitable query development and information retrieval technique can be used. It should simply be noted that adaptation according to the present technique works better with information retrieval techniques that return more relevant documents.

Next, the documents identified by the information retrieval query are retrieved. This is indicated by block 82. In one preferred embodiment, as indicated by dashed line 84 in FIG. 3, processing simply continues at block 86. In that preferred embodiment, the topic language model stored in module 70 is adjusted, or adapted, based upon the information stored in topic data store 72, and based upon the information retrieved from general data store 74 as a result of the query being executed against general data store 74. Thus, the probability estimates generated by the language model are adjusted based upon the text corpus which includes the information in both topic data store 72 and the information retrieved from general data store 74. This provides a much larger text corpus with which to adapt the language model stored in module 70 than by simply using the information stored in topic data store 72. Since the adaptation text corpus is much larger, the probabilities generated by the language model can be better estimated and the resulting language model yields a better (i.e., faster and more accurate) mechanism for modeling the actual usage by the user. The adaptation is indicated by block 86.

The way in which the language model is adapted can take any one of a number of forms. In one preferred embodiment, only a subset of the documents retrieved by the query against general data store 74 are used in adapting the language model stored in module 70. Also, the documents retrieved based upon the query against the general data store 74 can be weighted relative to those already contained in the topic data store 72. The documents retrieved are preferably weighted less than those already stored in data store 72. Thus, the effect on the language model stored in module 70 based on the retrieved documents is less than that based on the documents already stored (and presumably known to be relevant to the user).

Further, the language model can be adapted in another way. The results of the query can be used to build a language model which is combined with the language model already stored in module 70. This combination can be performed using any known smoothing technique, such as interpolation, deleted interpolation, or any other suitable technique. In the embodiment in which deleted interpolation is used for adapting the topic language model stored in module 70, the documents retrieved from general data store 74 and the documents already stored in topic data store 72 are weighted as follows:

$$\lambda P_r + (1-\lambda) P_t$$

where $P_r$ is a probability value generated by the language model based on retrieved documents;

$P_t$ is a probability value generated by the language model based on documents already in the topic data store 72; and λ is the deleted interpolation parameter having a value which is preferably experimentally determined. If the information retrieval technique is believed to be very accurate, λ will have a higher value (such as 0.8 or 0.9). However, where the information retrieval technique is not believed to be as accurate, λ may have a lower value (such as 0.4 or 0.5). However, any values of λ such as 0.1–0.9, or so, are suitable.

In yet another embodiment, the value of λ is incrementally increased as the number of queries increases. In other words, as the number of queries which have been executed increases, the text corpus used to adapt the language model will likely either get larger, or become more accurate, because the amount of information stored in topic data store 72 is likely larger. Thus, the documents retrieved using the information retrieval technique will likely be more relevant than those initially retrieved. Therefore, the value of λ can increase incrementally as the number of queries increases.

Further, it should be noted that several language models can be constructed from the retrieved data. For example, one language model can be constructed using the most relevant 100 documents, and a second language model can be constructed using the most relevant 200 documents, and so on. Multiple language models constructed using the retrieved documents can then be combined with the language model generated from the known relevant data from the topic data store 72 and also from the general language model. Language model combination using deleted interpolation can be expressed as:

$$\sum \lambda_i P_i$$

where $P_i$ is the probability generated by the $i^{th}$ language model and $0<=\lambda_i<=1$ is the interpolation weight for $i^{th}$ language model and $\Sigma\lambda_i=1$.

Once the language model is adapted, the adapted or adjusted language model is then used in speech recognition. This is indicated by block 88.

In accordance with one preferred aspect of the present invention, system 60 is configured to automatically, and intermittently regenerate a topic specific query and direct it against the information stored in general data store 74. For example, in the preferred embodiment, the language model stored in module 70 is adapted on-the-fly (e.g., as the user is using system 60). Therefore, system 60 may be configured to initially execute the query and adapt the language model as soon as system 60 is powered up, and then each time a new document is created. More preferably, however, system 60 is configured to generate a new query and adapt the language model intermittently, even while a document is being created. Thus, system 60 can be configured to repeat the query either every predetermined number of words, every predetermined time interval, or based on any other suitable criteria.

Whatever the criteria, it is used in setting a query threshold. System 60 thus determines whether the query threshold has been reached. If so, system 60 generates another query and executes it against the general data store as indicated by block 80. If the query threshold has not been reached, system 60 simply continues speech recognition as normal. This is indicated by blocks 90 and 92 in FIG. 3.

In accordance with other preferred features of the present invention, other information can also be used in adapting the language model stored in module 70. These features are represented by blocks 94, 96 and 98 in FIG. 3. For example, in one preferred embodiment, after the query has been executed against the information in general data store 74, a relevancy measure of each of the documents returned from the query is determined. The documents are then ranked according to the relevancy measure. This is indicated by block 94. Then, a subset of the documents returned (those having a relevancy measure above a relevancy threshold) are used in adapting a language model. Further, the documents returned can be weighted according to the relevancy measure as indicated by block 96. The documents can then be used, as weighted, to adapt the language model stored in module 70.

In yet another preferred embodiment of the present invention, other information is also used in adjusting the language model. For instance, system 60 can be configured to identify the particular application then being used by the user to prepare a document. For example, if the user is in a word processor application, the user may be generating a more formal document than if the user is in an e-mail application. System 60 can be configured to recognize the application, and either use that information in generating the query against the information contained in general data store 72 to look for more formal documents (i.e., documents having more formal word usage and word sequences) or to simply weight the more formal documents retrieved by the query higher than the less formal documents retrieved. Further, if the user pulls up a memo template, and is therefore generating an internal memo, system 60 can be configured to retrieve only similar memoranda from topic data store 72 in generating the query against the information stored in general data store 74.

Many other parameters could also be used in accordance with the present invention. For instance, a user may tend to dictate more formal documents, such as company letters and memoranda, during business hours, but generate less formal documents, such as personal letters, later in the day or in the evening. Therefore, based upon the time of day which the document is being created by the user, system 60 can be configured to generate the query by retrieving documents from topic data store 72 which were created at about the same time of day. System 60 can also be configured to simply weight similar documents retrieved based on the query more heavily than other documents.

It should also be noted that adaptation of the language model stored in module 70 can be performed intermittently regardless of whether the user is utilizing the speech recognition features of system 60. So long as system 60 is powered up, it can be configured to repeat the queries against the information stored in general data store 74 and adapt the language model stored in module 70 according to any given criteria.

Thus, it can be seen that the language model adaptation feature of the present invention can be used to quickly and efficiently expand the amount of user specific data available for generating or improving the language model stored in module 70. The user specific data that is available is first used as a query against a large information store to identify text or documents which are similar to the user specific documents. Then, the text corpus used to generate or adapt the user specific language model stored in module 70 is a much larger collection than would otherwise be the case, and the probabilities provided by the language model can be better estimated. Again, it should also be noted that the particular manner in which the language model is built and adapted, and the particular technique for performing information retrieval, are not critical to this aspect of the present invention, and any suitable techniques can be used.

Use of Language Models to Improve Information Retrieval

Figure 4:
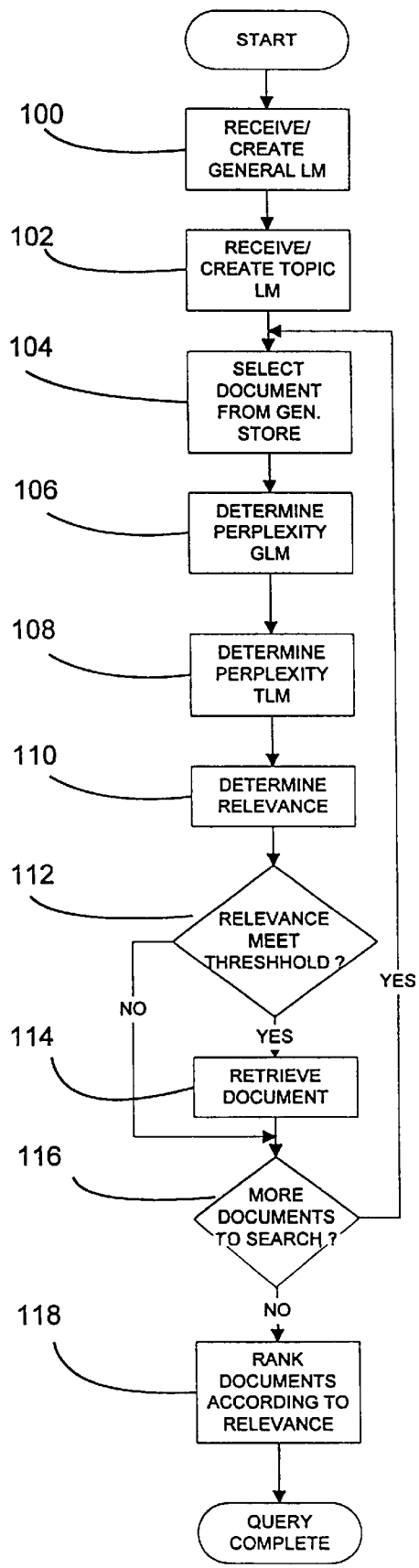
FIG. 4 is a flow diagram illustrating a technique for adapting a language model in accordance with another preferred embodiment of the present invention.

FIG. 4 is a flow diagram which illustrates a technique by which system 60 can improve information retrieval. As mentioned above, a statistical n-gram language model produces a probability estimate for a word given the word sequence up to that word (i.e., given the word history H). An n-gram language model considers only (n−1) prior words in the history H as having any influence on the probability of the next word. For example, a bi-gram (or 2-gram) language model considers the previous word as having an influence on the next word. Therefore, in an n-gram language model, the probability of a word occurring is represented as follows:

$$P(w/H)=P(w/w1,w2,...w(n-1)) \quad \text{Equation 1}$$

where w is the word of interest;
    w1 is the first word prior to word w in the sequence;
    w2 is the second word prior to word w; and
    w(n−1) is the word located n−1 positions prior to the word w.

Also, the probability of a word sequence is determined based on the multiplication of the probability of each word given its history. Therefore, the probability of a word sequence w1 ... wm is represented as follows:

$$P(w1 \ldots wm) = \prod_{i=1}^{N}(P(w_i/H_i)) \quad \text{Equation 2}$$

When discussing language models, the concept of perplexity of a word sequence is also known. Perplexity is a statistical measure of the average branching factor of the language model. In other words, perplexity is a statistical measure of the average number of possible words that would be predicted by the language model given the word or word sequence of interest. Therefore, the perplexity of a word sequence w1 ... wm given its history is represented as follows:

$$Perp = \exp\left[-\frac{1}{M}\log\prod P(w_i/H_i)\right]$$

$$= \exp\left[-\frac{1}{M}\left(\sum_{i=1}^{M}\log(Pw_i/H_i)\right)\right] \quad \text{Equation 3}$$

Further, the perplexity of a word sequence $\bar{x}$ with respect to a given language model LM will be represented as follows:

$$Perp(\bar{x}/LM) = \exp\left[-\frac{1}{M}\sum_{i=1}^{M}\log(P(\bar{x}/LM))\right] \quad \text{Equation 4}$$

Thus, the perplexity of a word sequence, given a language model, is approximately equal to the average number of words which would be predicted by that language model, given the word sequence and its history. This value changes with the predictive power of the particular language model being used. The particular manner in which the language model is built and the particular language model being used is not critical to the present invention.

One aspect of the present invention utilizes the concept of perplexity, as it relates to language models, in order to improve the accuracy of information retrieval executed by system 60. In order to do this, system 60 first either receives or creates a general language model as indicated by block 100 in FIG. 4. System 60 can thus be configured with a language model generator. In that instance, a large text corpus of training data is preferably provided to the language model generator which generates a general language model, based upon the large text corpus, in any known and suitable manner. The training data is preferably the information (or a subset of the information) stored in general data store 74. That language model is then stored in module 70. Alternatively, however, system 60 can be provided with a conventional, commercially available, general language model which is simply loaded into module 70. In another alternative system 60 creates the general language model from another large set of text data distinct from data in general data store 74. In the preferred embodiment, system 60 either creates, or is provided with, a trigram language model.

Next, system 60 either receives or creates a topic language model which is relevant to the particular topic of interest to the user. Again, system 60 can either be provided with a commercially available topic language model, or can generate and train a topic language model itself.

In order to generate a topic language model, the user preferably provides system 60 with training data which is relevant to the specific topic of interest. For example, the user may have several articles, and may wish to retrieve other similar articles from information stored in the general data store 74. Or the user can simply supply a search query or request to the system. A topic language model is either generated by system 60 using the relevant articles, or a portion of the text of those relevant articles is used to express a query against the information stored in general data store 74, and the information retrieved based on the query is used to generate the topic language model in combination with the user supplied information. In another preferred embodiment, when the training data used to generate the topic language model is sparse, the topic language model is generated using the sparse data, and then combined with a general language model to obtain the new topic language model. The combination technique is not critical to the present invention, and can be accomplished using a smoothing technique, such as interpolation, deleted interpolation, or any other suitable technique. The process of receiving or creating a topic language model is indicated by block 102 in FIG. 4.

After the general language model and the topic language model are generated or received by system 60, system 60 undertakes to assign a similarity measure to each document (or part of a document) in general data store 74 which is to be considered in the information retrieval process. In order to do this, system 60 first selects a document from general data store 74. This is indicated by block 104.

Next, system 60 determines the perplexity of that document, with respect to the general language model as indicated by block 106. This is represented as follows:

$$Perp(doc_i/GLM) \quad \text{Equation 5}$$

where GLM represents the general language model; and
    $doc_i$ represents the selected document.

System 60 then determines the perplexity of the document relative to the topic language model as indicated by block 108. This is indicated as follows:

$$Perp(doc_i/TLM) \quad \text{Equation 6}$$

where TLM represents the topic language model.
System 60 then determines a relevance measure for the selected document based upon the perplexities determined in blocks 106 and 108. The relevancy measure is preferably expressed in terms of a ratio of the two perplexities as follows:

$$\frac{Perp(doc_i / GLM)}{Perp(doc_i / TLM)} \quad \text{Equation 7}$$

Recall that the perplexity of a document (as a sequence of words), given a particular language model, is representative of approximately the average number of words that could be predicted by that language model given that document. Therefore, if the perplexity number is relatively high, then the training data used to develop that language model has not trained the language model well with respect to the terms being used in the document. Therefore, the document under consideration will tend not to be similar to the training data used to develop the language model. However, if the perplexity of that document is low, then the training data used to develop that language model has likely trained the language model well with respect to the terms appearing in the document, and the document is likely similar to the training data used to train that language model.

Therefore, in one preferred embodiment, a similarity measure can be returned using only the topic language model. However, in a more preferred embodiment, both the topic language model and the general language model are used. The reason for this is that some language constructs in a document may be more or less likely to appear, regardless of whether the document under consideration is relevant. It is desired that the information retrieval system not discriminate against those similar documents, even though the raw relevancy score obtained by applying the perplexity of the topic language model is fairly high. If that is the case, and the language constructs being used in the document of interest are fairly unlikely, then the perplexity value returned with respect to the general language model will also be high. By using the ratio of perplexities determined for the general language model and the topic language model, the system essentially returns a number which is determined against a base line (the general language model) and is thus more meaningful than the raw number which would be returned simply by providing the perplexity of the document relative to the topic language model. Thus, it is believed that providing the relevancy measure as a ratio of the two perplexities yields a more accurate measure of relevancy.

Similarly, if the language constructs used in the document of interest are quite common, regardless of the topic of interest, then the perplexity value returned by the topic language model will be relatively low. Even though the document may not be particularly relevant. However, the perplexity value returned by the general language model will also likely be quite low. Therefore, by providing the relevancy measure as a ratio of the two perplexities, it is believed that the information retrieval technique will retrieve more relevant documents.

The step of determining relevancy of the selected document based on the perplexities is indicated by block 110. Expression of the relevancy factor as a ratio of the two perplexities can be expanded as follows:

$$\text{relevancy} = \frac{\exp\left[-\frac{1}{M}\sum_{i=1}^{M}\log(P_G(w_i/H_i))\right]}{\exp\left[-\frac{1}{M}\sum_{i=1}^{M}\log(P_T(w_i/H_i))\right]} \quad \text{Equation 8}$$

$$= \exp\left[-\frac{1}{M}\left(\sum_{i=1}^{M}\log P_G(w_i/H_i) - \sum_{i=1}^{M}\log P_T(w_i/H_i)\right)\right]$$

where $P_T$=the probability of a word sequence, given its history, with respect to the topic language model; and $P_G$=the probability of a word sequence, given its history, with respect to the general language model.

Once the relevancy measure has been determined, system 60 determines whether the relevancy measure meets a relevancy threshold. The relevancy threshold can be predetermined, input by the user, or adapted based on the number of documents being retrieved by system 60, or based on other criteria. System 60 merely determines whether the document has a high enough relevancy measure so as to be provided to the user. This is indicated by block 112.

If the document does not meet the relevancy threshold, it is not provided to the user and processing continues with respect to block 116. However, if the document does meet the relevancy threshold, it is retrieved and either stored in topic data store 72, or provided to the user at output device 76. This is indicated by block 114.

System 60 then determines whether it is to examine additional documents in general data store 74. If so, processing reverts back to block 104 where another document is selected and the relevancy of that document is determined. If no more documents are to be examined, processing continues with respect to optional block 118. This is indicated by block 116.

Once all the documents (or a subset of the documents) have been examined, system 60 can either simply provide the documents to the user, store the documents, or rank the documents according to relevance. In the embodiment in which the documents are ranked according to relevance, system 60 simply ranks the documents according to the relevance measure determined for each document. System 60 can then either provide the documents ranked according to relevance, to the user, or can simply provide a subset of the documents retrieved based upon the ranking. This is indicated by block 118.

Using this technique, it can be seen that the general language model needs to be generated only once based on the information stored in general data store 74, or some representative sample of that information. Alternatively, the general language model may be updated intermittently as the contents of the information in general data store 74 changes. The topic language model is preferably generated once for each query provided by the user.

Conclusion

One aspect of the present invention provides a technique which uses information retrieval to improve and adapt a language model or models being used during speech recognition. The system uses the known history of text already generated by the user to develop and adapt the language model directly, but also directs a topic specific query against the general data store in order to find similar documents to expand the training data used for generating or adapting the language model. This provides a much more accurate language model than broad, preconceived, topic dependent language models used in the past. The query against the large data store is also preferably periodically or intermittently repeated to obtain a dynamically adapted language model with increased accuracy.

Another aspect of the present invention uses language models to improve information retrieval techniques. The system preferably obtains a general language model and a topic language model (either using the technique described above, or another known technique). The system then calculates a relevancy measure of documents being searched based upon perplexity values returned by the language models obtained. Since language models are context dependent models, this allows the system to not only consider the words themselves, but the context in which the words appear to determine the relevancy of the document. This improves both the recall and the precision of the information retrieval technique, results in a better estimation of the likelihood (or probability) that relevant information appears in the document being searched, and thus results in better performance of the information retrieval system.

Although the present invention has been described with reference to preferred embodiments, workers skilled in the art will recognize that changes may be made in form and detail without departing from the spirit and scope of the invention.

What is claimed is:

1. A method of adapting a language model used in a speech recognition system which has access to a first data store and a second data store, the second data store being large relative to the first data store, the method comprising:

formulating an information retrieval query based on information contained in the first data store;

querying the second data store based on the query formulated;

retrieving information from the second data store based on the query; and adapting the language model based on the information retrieved and the information in the first data store.

2. The method of claim 1 and further comprising:

repeating the steps of formulating, querying, retrieving, and adapting while a user is using the speech recognition system.

3. The method of claim 2 wherein the steps of formulating, querying, retrieving, and adapting are performed intermittently while a user is using the speech recognition system.

4. The method of claim 1 wherein formulating an information retrieval query comprises:

formulating an information retrieval query based on documents previously created by the user and stored in the first data store.

5. The method of claim 1 wherein formulating an information retrieval query comprises:

formulating an information retrieval query based on information contained in a document then being prepared by the user.

6. The method of claim 1 wherein formulating an information retrieval query comprises:

formulating an information retrieval query based on information related to a type of document then being prepared by the user.

7. The method of claim 6 wherein formulating an information retrieval query comprises:

formulating an information retrieval query based on a template then being used by the user to prepare the document.

8. The method of claim 6 wherein formulating an information retrieval query comprises:

formulating an information retrieval query based on an application program then being used by the user to prepare the document.

9. The method of claim 6 wherein formulating an information retrieval query comprises:

formulating an information retrieval query based on a time of day during which the user is preparing the document.

10. The method of claim 1 wherein retrieving information comprises:

retrieving a plurality of documents from the second information store; and determining a relevance measure associated with each document retrieved.

11. The method of claim 10 wherein adapting the language model comprises:

adapting the language model based on relevant documents retrieved which have a relevance measure which meets a threshold value.

12. The method of claim 11 wherein adapting the language model comprises:

assigning a weight to each relevant document; and adapting the language model based on the relevant documents according to the weight assigned to each relevant document.

13. The method of claim 1 wherein retrieving information from the second data store comprises retrieving a plurality of documents from the second data store and further comprising:

weighting the documents retrieved from the second data store lower than the information in the first data store; and wherein adapting the language model comprises adapting the language model based on the information in the first data store and the documents retrieved, as weighted against the information in the first data store.

14. The method of claim 1 wherein the language model includes probability estimates of word sequences, and wherein adapting the language model comprises:

adjusting the probability estimates based on the information in the first data store and the information retrieved from the second data store.

15. The method of claim 12 wherein assigning a weight to the documents retrieved from the second data store comprises:

assigning an increased weight to the documents retrieved from the second data store as a number of times the second data store is queried increases, at least until the increased weight reaches a weight threshold.

16. The method of claim 1 wherein querying the second data store comprises:

querying information through a global computer network.

17. The method of claim 1 wherein adapting comprises:

constructing a first language model based on the information retrieved from a first query and the information in the first data store.

18. The method of claim 17 wherein adapting further comprises:

constructing a second language model based on the information retrieved from a subsequent query; and combining the first and second language models.

19. A method of retrieving information from a second data store which is relevant to information stored in a first data store wherein the second data store is larger than the first data store, the method comprising:

providing a first language model based on information stored in the first data store;

providing a second language model;

determining a first perplexity of a document in the second data store, given the first language model;

determining a second perplexity of the document, given the second language model;

determining a relevancy measure of the document based on the first and second perplexities; and selectively retrieving the document based on the relevancy measure.

20. The method of claim 19 and further comprising:

repeating the steps of determining a first perplexity, determining a second perplexity and determining a relevancy measure, for a plurality of documents in the second data store; and retrieving relevant documents from the plurality of documents which have a relevancy measure which meets a threshold level.

21. The method of claim 19 wherein providing a second language model comprises:

providing the second language model based on information stored in the second data store.

22. The method of claim 19 wherein determining a relevancy measure comprises:

determining a ratio of the first and second perplexities relative to one another; and determining the relevancy measure based on the ratio.

23. The method of claim 20 wherein retrieving relevant documents comprises:

ranking documents according to the relevancy measure determined for each document.

24. A method of retrieving information from a second data store which is relevant to information stored in a first data store wherein the second data store is larger than the first data store, the method comprising:

providing a first context dependent language model based on information in the first data store;

providing a second context dependent language model based on information in the second data store;

determining a relevancy of a document in the second data store based on a predictive capability of the first language model given the document and based on a predictive capability of the second language model given the document; and retrieving the document if the relevancy meets a relevancy threshold value.

25. The method of claim 24 wherein determining a relevancy of the document based on a predictive capability of the first and second language models comprises:

determining the relevancy based on a branching factor of the first language model given the document and based on a branching factor of the second language model given the document.

26. The method of claim 24 and further comprising:

repeating the steps of determining a relevancy for a plurality of documents in the second data store;

comparing the relevancy determined to the relevancy threshold; and retrieving the documents having a relevancy which meets the relevancy threshold.

27. The method of claim 26 and further comprising:

adapting the relevancy threshold based on a number of documents which meet the relevancy threshold.

28. The method of claim 24 wherein providing the first language model comprises:

querying the second data store based on information in the first data store; and constructing the first language model based on the information in the first data store and based on information from the second data store retrieved based on the query.

29. The method of claim 24 wherein providing the first language model comprises:

constructing a preliminary language model based on information in the first data store; and combining the preliminary language model with the second language model to obtain the first language model.

30. The method of claim 24 wherein providing the second language model comprises:

constructing the second language model based on a subset of all information stored in the second data store.

31. A method of retrieving information from a second data store which is relevant to information stored in a first data store wherein the second data store is larger than the first data store, the method comprising:

providing a first language model based on information stored in the first data store;

determining a first perplexity of a document in the second data store, given the first language model;

determining a relevancy measure of the document based on the first perplexity;

repeating the steps of determining a first perplexity, and determining a relevancy measure, for a plurality of documents in the second data store; and retrieving relevant documents from the plurality of documents which have a relevancy measure which meets a threshold level.

32. The method of claim 31 and further comprising:

providing a second language model based on information stored in the second data store;

determining a second perplexity of the document, given the second language model;

wherein determining a relevancy measure comprises determining the relevancy measure of the document based on the first perplexity and based on the second perplexity; and wherein repeating comprises repeating the steps of determining a first perplexity, determining a second perplexity and determining a relevancy measure, for a plurality of documents in the second data store.

33. A method of recognizing speech, comprising:

providing a first data store;

providing a second data store, the second data store being large relative to the first data store;

providing a language model;

formulating an information retrieval query based on information contained in the first data store;

querying the second data store based on the query formulated;

retrieving information from the second data store based on the query; and adapting the language model based on the information retrieved and the information in the first data store.

34. The method of claim 33 and further comprising:

repeating the steps of formulating, querying, retrieving, and adapting, intermittently, while a user is using the speech recognition system.

35. The method of claim 34 wherein repeating comprises:

repeating the steps intermittently based on time.

36. The method of claim 34 wherein repeating comprises:

repeating the steps while the user is preparing a document using the speech recognition system after a predetermined number of words have been recognized during preparation of the document.

* * * * *

UNITED STATES PATENT AND TRADEMARK OFFICE
CERTIFICATE OF CORRECTION

PATENT NO. : 6,418,431 B1
DATED : July 9, 2002
INVENTOR(S) : Mahajan et al.

It is certified that error appears in the above-identified patent and that said Letters Patent is hereby corrected as shown below:

Column 5,
Line 50, replace "are" with -- area --.

Column 7,
Line 18, replace "w," with -- w2, --.

Column 8,
Line 61, replace the equation with the following:

$$\lambda P_r + (1-\lambda)P_t$$

Signed and Sealed this

Eleventh Day of March, 2003

JAMES E. ROGAN
*Director of the United States Patent and Trademark Office*